United States Patent [19]

Sie

[11] Patent Number: 5,186,859
[45] Date of Patent: Feb. 16, 1993

[54] PROCESS FOR CATALYTIC PARTIAL OXIDATION OF A HYDROCARBON-CONTAINING FUEL USING ENTRAINED CATALYST

[75] Inventor: Swan T. Sie, Amsterdam, Netherlands

[73] Assignee: Shell Oil Company, Houston, Tex.

[21] Appl. No.: 822,769

[22] Filed: Jan. 21, 1992

[51] Int. Cl.$^5$ ................................................ C01B 3/28
[52] U.S. Cl. .................................................... 252/373
[58] Field of Search ........................................ 252/373

[56] References Cited

U.S. PATENT DOCUMENTS

| | | | |
|---|---|---|---|
| 2,482,866 | 9/1949 | Phinney | 252/373 |
| 2,681,272 | 6/1954 | Jewell | 48/196 |
| 3,632,304 | 1/1972 | Hardison | 23/2 S |

FOREIGN PATENT DOCUMENTS

| | | |
|---|---|---|
| 0164864 | 12/1985 | European Pat. Off. . |
| 0335668 | 10/1989 | European Pat. Off. . |
| 793504 | 4/1958 | United Kingdom . |

Primary Examiner—Howard T. Mars

[57] ABSTRACT

Catalytic partial oxidation process for converting natural gas to synthesis gas in which the process operates at high temperature T>1000° C. with entrained catalyst. Fine catalyst particles are transferred by means of a gas stream to a burner device which effects a rapid and intensive mixing of this gas stream with the reactants, e.g., natural gas, oxygen and steam. The catalyst entrained by the product gas stream is separated from this stream and recycled to the reactor.

8 Claims, 1 Drawing Sheet

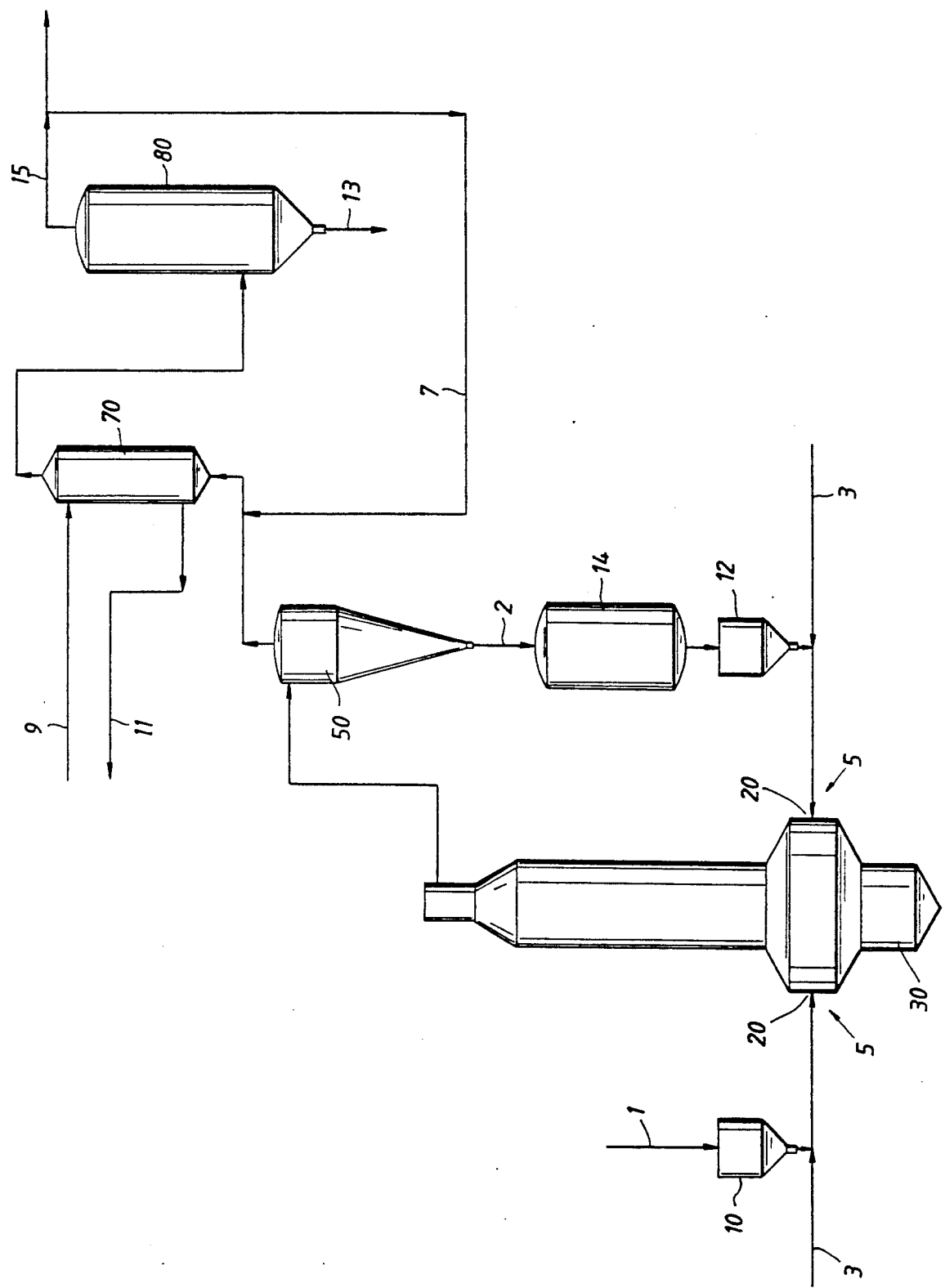

PROCESS FOR CATALYTIC PARTIAL OXIDATION OF A HYDROCARBON-CONTAINING FUEL USING ENTRAINED CATALYST

FIELD OF THE INVENTION

The present invention relates to a process for catalytic partial oxidation of a hydrocarbon-containing fuel. In particular, the invention relates to a catalytic partial oxidation process for converting natural gas to synthesis gas.

BACKGROUND OF THE INVENTION

Catalytic processes for the conversion of synthesis gas into hydrocarbons and/or oxygenated hydrocarbons are well known in the art. The production of synthesis gas for use in these processes is generally accomplished by either steam reforming, autothermal reforming or non-catalytic partial oxidation of light hydrocarbons. These processes generally result in synthesis gas in a form which requires a considerable number of intermediate steps prior to conversion into useful products.

Steam reforming is a highly endothermic reaction which is carried out in multitubular reactors with excess steam. The product synthesis gas has a hydrogen to carbon monoxide ratio of at least 3:1, depending upon the excess steam used, which is higher than the ratio of about 2:1 generally required for subsequent conversion into, for example, methanol. For methanol production, the synthesis gas resulting from steam reforming requires further treatment by way of adjustment of the hydrogen to carbon monoxide ratio.

Partial oxidation of natural gas involving the use of a catalyst is an attractive route for producing synthesis gas for further conversion of synthetic hydrocarbon fuels such as middle distillates, methanol and other fuels and chemicals. The ideal process would operate at high temperatures above 1,000° C. for thermodynamic reasons and at elevated pressure of 30 bar and higher and very high space velocities of 100,000 Nl/en.

European Patent Application No. 0164864 relates to a process for the production of a gaseous mixture principally comprising carbon monoxide and hydrogen in a particulate bed reactor. A saturated hydrocarbon-and an oxygen-containing gas having a ratio of hydrocarbon to oxygen of greater than the stoichiometric ratio for complete combustion are introduced into the bed. The hydrocarbon and oxygen containing gas may be premixed before being introduced into the bed through a nozzle. Alternatively the reactant gases may be allowed to mix at the point of injection to the bed.

European Patent Application No. 0335668 relates to a catalytic process where synthesis gas is produced by the reaction of light hydrocarbons, primarily methane, in a fluid bed reaction zone. The catalyst used in preparing the synthesis gas is such that the back reaction of carbon monoxide and hydrogen to form methane during the cooling step is substantially eliminated.

The catalytic partial oxidation process for complete premixing of the reactants at a temperature of about 800° C. to about 1200° C. without the possibility of flashback and without the chance of ignition of the mixture by hot walls of the mixer device or by entrained metal particles or oil droplets is, however, not easily fulfilled and careful design of this critical part of the reactor is needed especially for safety reasons.

It is an object of the present invention to ensure that the partial oxidation reactions are induced catalytically and occur simultaneously with endothermic reforming reactions without the possibility of flashback and without the chance of ignition of the mixture by the hot walls of the mixer device or by entrained metal particles or oil droplets.

SUMMARY OF THE INVENTION

The invention therefore provides a process for catalytic partial oxidation of a hydrocarbon-containing fuel. The steps comprise mixing reactants such as an oxygen-containing gas and a hydrocarbon-containing fuel. Optionally, a moderator can be added to the steps of the process while transferring a catalyst in the form of fine particles to the mixing zone by means of a carrier gas. Instead of premixing the oxygen-containing gas that allows the reaction to be ignited, the mixing proceeds in the presence of the catalyst which is subsequently entrained in the product gas while passing through the reactor. The catalyst is subsequently separated from the product gas. Steam or carbon dioxide can be used as a moderator.

DETAILED DESCRIPTION OF THE INVENTION

The invention will now be described by way of example in more detail with reference to the accompanying drawing in which the FIGURE is a simplified flow scheme of the process of the present invention.

Referring now to the FIGURE, the catalyst 1 preferably consists of a metal or metals of Group VIII such as nickel, iron or platinum, most preferably platinum, and is transported by a suitable carrier gas via a vessel 10 with the fuel feed stream 3 to the burners 20 where it enters the reactor 30 together with the reactant gases 5 oxygen, moderator, e.g., steam under intensive mixing conditions. The preferred temperature conditions of the process are from about 800° C. to about 1400° C., most preferably from about 800° C. to about 1200° C., and the preferred pressure range of the process is from about 1 bar to about 10 bars, most preferably from about 1 bar to about 5 bars. The partial oxidation reactions occur in this reactor, which is in essence an empty vessel suitable for containing the hot gas at elevated pressure. The catalyst is subsequently entrained by the product gas through the reactor 30 and the bulk of the catalyst is separated from the product gas by a hot cyclone 50 or similar type of separator. The catalyst is already present during the mixing process in conjunction with an oxygen-containing gas, a hydrocarbon-containing fuel, and optionally a moderator in the absence of the catalyst. The unignited mixture containing an oxygen-containing gas and a hydrocarbon-containing fuel is then transferred to a stationary catalytic zone. The premixing ensures intensive contact with the gaseous reactants from the onset until the completion of the reactions involved. The recycled catalyst 2 that is separated off is now available for reintroduction into the reactor 30 through vessels 14 and 12 respectively.

The product gas stream leaving the separator 50 is cooled by quenching it with recycled product gas 7 to bring the temperature down to operate a waste heat boiler 70 provided with a boiling feed water supply 9 and a steam discharge 11. After leaving the waste heat boiler 70, the residual amount of catalyst is removed by, e.g., a bag filter 80 having a discharge 13 for the catalyst. The product gas is leaving the bag filter 80 via line 15.

The advantage of this over the known systems is that the catalytic combustion can be carried out by means of a burner device, which is one single piece of equipment of which the surfaces facing the flame can be cooled. As carrier gas for the catalyst powder, one could use at least part of the fuel feed stream, the oxygen stream, steam or an auxiliary transport gas, such as synthesis gas produced by the partial oxidation process.

The process of the invention will enjoy the same advantages as the known processes in terms of lower oxygen requirement and absence of contaminants. However, the process of the invention has a greater flexibility than the known processes in terms of catalyst, temperature, and pressure, where the preferred temperature ranges from about 800° C. to about 1200° C., and the preferred pressure ranges from about 1 to about 5 bar. In addition, it is possible to operate nearer to the conditions where the carbon is formed. Carbon formation must be completely avoided in the known process, while a modest amount of carbon formed in the process of the invention will cause little harm. Carbon, if formed, will be gasified completely or to a large degree at the higher temperatures and longer residence time of the present process. Any residual carbon particles will be removed from the gas stream together with the catalyst and recycled to the reactor.

The following values are typical of those which will be encountered during the catalytic partial oxidation process of the invention:

| | |
|---|---|
| Capacity, t/d | 1700 $CH_4$ |
| Syngas production, | |
| $Nm^3/h$ | 300,000 |
| $10^6 Nm^3/h$ | 7.2 |
| Intake: | |
| $CH_4$, $Nm^3/h$ | 100,000 |
| $O_2$, $Nm^3/h$ | 50,000 |
| steam, $Nm^3/h$ | 50,000 |
| Reactor volume, | |
| $m^3$ | 30 |
| P, bar | 30 |
| $T_{exit}$, °C. | 1200 |
| Total feed per volume of reactor space per hour ($Nm^3/m^3/h$) | 6,600 |
| Approx. Residence time of gas, s | 1.7 |
| Pt inventory of reactor, kg | 0.05 |
| Catalyst inventory of reactor, t (5000 ppm Pt) | 0.01 |
| Catalyst circulation rate, t/min | 0.4 |

Various modifications of the invention will become apparent for those skilled in the art and it is intended that such modifications will fall under the scope of the appended claims.

What is claimed is:

1. A process for catalytic partial oxidation of a hydrocarbon-containing fuel to produce carbon monoxide and hydrogen, the process comprising the steps of mixing in a mixing zone an oxygen-containing gas, a hydrocarbon-containing fuel and, optionally, a moderator, with a catalyst in the form of fine particles transferred to the mixing zone by means of a carrier gas, in which zone the partial oxidation reaction is ignited and proceeds in the presence of the catalyst, subsequently entraining the catalyst with the reaction product gas through the reactor and separating the catalyst from the product gas.

2. The process according to claim 1, wherein the carrier gas is part of the fuel stream.

3. The process according to claim 1, wherein the carrier gas is part of the oxygen stream.

4. The process according to claim 1, wherein the carrier gas is an auxiliary transport gas.

5. The process according to claim 4, wherein the transport gas is synthesis gas produced by said process.

6. The process according to claim 1, wherein the fuel is natural gas.

7. The process according to claim 1, wherein the moderator is steam or carbon dioxide.

8. The process according to claim 1, wherein the catalyst is recycled to the reactor.

* * * * *